United States Patent
Sun et al.

(10) Patent No.: US 9,525,537 B2
(45) Date of Patent: Dec. 20, 2016

(54) METHOD OF AND APPARATUS FOR INFORMING DYNAMIC UPLINK AND DOWNLINK CONFIGURATION IN HETEROGENEOUS NETWORK

(75) Inventors: Fanglei Sun, Shanghai (CN); Xiaobo Zhang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 318 days.

(21) Appl. No.: 14/239,506

(22) PCT Filed: Jul. 31, 2012

(86) PCT No.: PCT/IB2012/001569
§ 371 (c)(1),
(2), (4) Date: Feb. 18, 2014

(87) PCT Pub. No.: WO2013/024335
PCT Pub. Date: Feb. 21, 2013

(65) Prior Publication Data
US 2014/0177492 A1  Jun. 26, 2014

(30) Foreign Application Priority Data
Aug. 17, 2011  (CN) .......................... 2011 1 0236650

(51) Int. Cl.
*H04L 5/00* (2006.01)
*H04L 5/14* (2006.01)
(Continued)

(52) U.S. Cl.
CPC .......... *H04L 5/0094* (2013.01); *H04L 5/0082* (2013.01); *H04L 5/14* (2013.01); *H04L 5/1469* (2013.01);
(Continued)

(58) Field of Classification Search
CPC ..... H04L 5/0094; H04L 5/14; H04W 72/0446; H04W 88/085; H04W 72/1289
(Continued)

(56) References Cited

U.S. PATENT DOCUMENTS

2002/0128035 A1* 9/2002 Jokinen ................ H04W 36/14
455/552.1
2010/0329107 A1  12/2010 Yuk et al.
(Continued)

FOREIGN PATENT DOCUMENTS

CN  1282493 A  1/2001
CN  101483510 A  7/2009
(Continued)

OTHER PUBLICATIONS

Hyoungju Ji, Younsun Kim, Seunghoon Choi, Joonyoung Cho and Juho Lee, "Dynamic resource adaptation in beyond LTE-A TDD heterogeneous networks," 2013, Communications Workshops (ICC), 2013 IEEE International Conference on, Budapest, pp. 133-137. doi: 10.1109/ICCW.2013.6649215.*
(Continued)

*Primary Examiner* — Mark Rinehart
*Assistant Examiner* — Kenneth P Hunt
(74) *Attorney, Agent, or Firm* — Fay Sharpe, LLP

(57) ABSTRACT

The invention discloses a method and device, in a central processing unit of a control device of a pico cell or a macro cell of a heterogeneous network based upon a time division duplex system, for instructing a user equipment to perform dynamic uplink and downlink resource configuration. In the method, the central processing unit indicates whether a dynamic uplink and downlink configuration is triggered for the user equipment by using a bit reserved in broadcast channel signaling; allocates a resource of a sub frame in a frame for downlink control information in physical down-
(Continued)

link control channel signaling when the dynamic uplink and downlink configuration is triggered for the user equipment, wherein a location of the subframe in the frame corresponds in a one-to-one manner to a dynamic uplink and downlink configuration type currently adopted for the user equipment, and the location of the sub-frame in the frame indicates a dynamic uplink and downlink configuration type currently adopted for the user equipment; and transmits the physical downlink control channel signaling including the frame to the user equipment.

15 Claims, 3 Drawing Sheets

(51) Int. Cl.
*H04W 72/04* (2009.01)
*H04W 88/08* (2009.01)

(52) U.S. Cl.
CPC ........ *H04W 72/0446* (2013.01); *H04L 5/0007* (2013.01); *H04L 5/0035* (2013.01); *H04L 5/0044* (2013.01); *H04W 88/085* (2013.01)

(58) Field of Classification Search
USPC ......................................................... 370/280
See application file for complete search history.

(56) References Cited

U.S. PATENT DOCUMENTS

| | | | |
|---|---|---|---|
| 2011/0103330 A1 | 5/2011 | Montojo et al. | |
| 2011/0176461 A1 | 7/2011 | Astely et al. | |
| 2012/0155411 A1* | 6/2012 | Ancora | H04J 11/0056 370/329 |
| 2013/0044651 A1* | 2/2013 | Wang | H04W 72/0406 370/280 |
| 2013/0114472 A1* | 5/2013 | Tamaki | H04L 1/1854 370/280 |
| 2013/0176886 A1* | 7/2013 | Joung | H04W 24/00 370/252 |
| 2014/0247801 A1* | 9/2014 | Oizumi | H04L 5/0037 370/329 |

FOREIGN PATENT DOCUMENTS

| | | |
|---|---|---|
| CN | 101658008 A | 2/2010 |
| CN | 101483510 B | 12/2010 |
| JP | 2011-503949 A | 1/2011 |
| JP | 2011-521500 A | 7/2011 |
| WO | 2008/084445 A2 | 7/2008 |
| WO | 2011/038272 A1 | 3/2011 |

OTHER PUBLICATIONS

Z. Shen, A. Khoryaev, E. Eriksson and X. Pan, "Dynamic uplink-downlink configuration and interference management in TD-LTE," Nov. 2012, in IEEE Communications Magazine, vol. 50, No. 11, pp. 51-59, doi: 10.1109/MCOM.2012.6353682.*

Sharp "Fast uplink-downlink re-configuration with traffic adaptation by PHY layer signaling," Aug. 22-26, 2011, 3GPP TSG-RAN WG1 #66.*

Nokia Siemens Networks, Nokia "Discussion on signalling support for the indication of dynamic TDD UL/DL reconfiguration" Apr. 15-19, 2013, 3GPP TSG-RAN WG1 Meeting #72 bis.*

LG Electronics "Signaling Mechanism for dynamic TDD UL-DL reconfiguration" Apr. 15-19, 2013 3GPP TSG RAN WG1 Meeting #72bis.*

Alcatel-Lucent, Alcatel-Lucent Shanghai Bell, "TDD DL-UL Reconfiguration Study Item," 3GPP TSG-RAN-WG4 Meeting #60, Athens, Greece, Aug. 22-26, 2011, Agenda Item: 10.4, Document for: Discussion, 5 pages.

"LTE; Evolved Universal Terrestrial Radio Access (E-UTRA); Physical layer procedures," 3GPP TS 36.213 version 8.8.0 Release 8, ETSI TS 136 213 V8.8.0, Oct. 2009, Technical Specification, 79 pages.

* cited by examiner

UL-DL configuration type on BCCH

Trigger indication (TI): TI=1, trigger; TI=0, not trigger reserved bits on PBCH

METHOD OF AND APPARATUS FOR INFORMING DYNAMIC UPLINK AND DOWNLINK CONFIGURATION IN HETEROGENEOUS NETWORK

FIELD OF THE INVENTION

The present disclosure relates to a heterogeneous network and particularly to a method of and apparatus for informing uplink and downlink resource configuration in an uplink and downlink resource configuration.

BACKGROUND OF THE INVENTION

In an LTE Time Division Duplex (TDD) operation mode, asymmetric uplink and downlink allocation is allowed by providing seven different types of semi-statically configured uplink and downlink configuration. The allocation can provide downlink subframes ranging from 40% to 90%. The semi-static configuration may mismatch an instant service condition, thus resulting in inefficient utilization of resources. The existing mechanism to adapt uplink and downlink allocation is based upon a system information modification process. Other mechanisms may include dynamic uplink and downlink subframe allocation.

However in a heterogeneous network (HTN), the same semi-static uplink and downlink configuration is adopted by user equipments of both a macro cell and a pico cell when the macro cell and the pico cell have the same cell ID, but the user equipments of the macro cell and those of the pico cell typically have different service traffic, so the same semi-static uplink and downlink configuration can not satisfy a dynamic varying demand of the user equipments of the pico cell for service traffic. Furthermore when the macro cell and the pico cell have their own cell IDs, the semi-static configuration has a too long cycle to satisfy the rapidly varying demand of the user equipments in the pico cell for service traffic.

SUMMARY OF THE INVENTION

In order to support service-adaptive dynamic frame configuration in a heterogeneous network, the invention considers a design/redefinition of implicit and explicit signaling.

According to a first aspect of the invention, there is provided a method, in a central processing unit of a control device of a pico cell or a macro cell of a heterogeneous network based upon a time division duplex system, of instructing a user equipment to perform dynamic uplink and downlink resource configuration, the method including the steps of: A. indicating whether the dynamic uplink and downlink configuration is triggered for the user equipment by using a bit reserved in broadcast channel signaling; B. allocating a resource of a subframe in a frame for downlink control information in physical downlink control channel signaling when the dynamic uplink and downlink configuration is triggered for the user equipment, wherein a location of the subframe in the frame corresponds in a one-to-one manner to a dynamic uplink and downlink configuration type currently adopted by the user equipment, and the location of the subframe in the frame indicates a dynamic uplink and downlink configuration type currently adopted by the user equipment; and C. transmitting the physical downlink control channel signaling including the frame to the user equipment.

According to a second aspect of the invention, there is provided a method, in a control device of a pico cell of a heterogeneous network based upon a time division duplex system, of instructing a user equipment to perform a dynamic uplink and downlink resource configuration, the method including the steps of: transmitting newly defined downlink control information to the user equipment to inform the user equipment of the dynamic uplink and downlink resource configuration, the newly defined downlink control information including a dynamic uplink and downlink configuration type and information for uplink and downlink co-channel or neighboring channel interference cancellation or coordination.

According to a third aspect of the invention, there is provided a method, in a user equipment in a pico cell of a heterogeneous network based upon a time division duplex system, of obtaining dynamic uplink and downlink resource configuration information from a base station, the method including the steps of: receiving broadcast channel signaling from the base station, wherein the broadcast channel signaling includes a bit indicating whether dynamic uplink and downlink configuration is triggered for the user equipment; and receiving physical downlink control channel signaling when the bit indicates that the dynamic uplink and downlink configuration is triggered for the user equipment, wherein the physical downlink control channel signaling includes downlink control information, and a location of a subframe including the downlink control information in a frame indicates a dynamic uplink and downlink configuration type currently adopted by the user equipment; and performing corresponding uplink and downlink transmission according to the dynamic uplink and downlink configuration type.

According to a fourth aspect of the invention, there is provided a method, in a user equipment in a pico cell of a heterogeneous network based upon a time division duplex system, of obtaining dynamic uplink and downlink resource configuration information from a base station, the method including the step of: receiving downlink control information from the base station to informing the user equipment of dynamic uplink and downlink resource configuration, the downlink control information including an uplink and downlink configuration type and information for uplink and downlink co-channel or neighboring channel interference cancellation or coordination.

According to a fifth aspect of the invention, there is provided a first apparatus, in a central processing unit of a control device of a pico cell or a macro cell of a heterogeneous network based upon a time division duplex system, for instructing a user equipment to perform a dynamic uplink and downlink resource configuration, the first apparatus including: a first triggering device configured to indicate whether the dynamic uplink and downlink configuration is triggered for the user equipment by using a bit reserved in broadcast channel signaling; an allocating device configured, to allocate a resource of a subframe in a frame for downlink control information in physical downlink control channel signaling when the dynamic uplink and downlink configuration is triggered for the user equipment, wherein a location of the subframe in the frame corresponds in a one-to-one manner to a dynamic uplink and downlink configuration type currently adopted by the user equipment, and the location of the subframe in the frame indicates a dynamic uplink and downlink configuration type currently adopted for the user equipment; and a first transmitter configured to transmit the physical downlink control channel signaling including the frame to the user equipment.

According to a sixth aspect of the invention, there is provided a second apparatus, in a control device of a pico cell of a heterogeneous network based upon a time division duplex system, for instructing a user equipment to perform a dynamic uplink and downlink resource configuration, the second apparatus including: a second transmitter configured to transmit newly defined downlink control information to the user equipment to inform the user equipment of the dynamic uplink and downlink resource configuration, the newly defined downlink control information including an uplink and downlink configuration type and information for uplink and downlink co-channel or neighboring channel interference cancellation or coordination.

According to a seventh aspect of the invention, there is provided a third apparatus, in a user equipment in a pico cell of a heterogeneous network based upon a time division duplex system, for obtaining dynamic uplink and downlink resource configuration information from a base station, the third apparatus including: a first receiver configured to receive broadcast channel signaling from the base station, wherein the broadcast channel signaling includes a bit indicating whether dynamic uplink and downlink configuration is triggered for the user equipment; and the first receiver is further configured to receive physical downlink control channel signaling when the bit indicates that the dynamic uplink and downlink configuration is triggered for the user equipment, wherein the physical downlink control channel signaling includes downlink control information, and a location of a subframe including the downlink control information in a frame indicates a dynamic uplink and downlink configuration type currently adopted by the user equipment; and a transmitter configured to perform corresponding uplink and downlink transmission according to the dynamic uplink and downlink configuration type.

According to an eighth aspect of the invention, there is provided a fourth apparatus, in a user equipment in a pico cell of a heterogeneous network based upon a time division duplex system, for obtaining dynamic uplink and downlink resource configuration information from a base station, the fourth apparatus including: a second receiver configured to receive downlink control information from the base station to inform the user equipment of dynamic uplink and downlink resource configuration, the downlink control information including an uplink and downlink configuration type and information for uplink and downlink co-channel or neighboring channel interference cancellation or coordination.

With the solution of the invention, dynamic uplink and downlink configuration is preferably provided to thereby improving the utilization ratio of a bandwidth.

BRIEF DESCRIPTION OF DRAWINGS

Other features, objects and advantages of the invention will become more apparent from the foregoing detailed description of non-limiting embodiments with reference to the drawings in which.

Throughout the drawings, like or similar reference numerals denote like or similar step features or devices/modules.

DETAILED DESCRIPTION OF EMBODIMENTS

Figure 1:
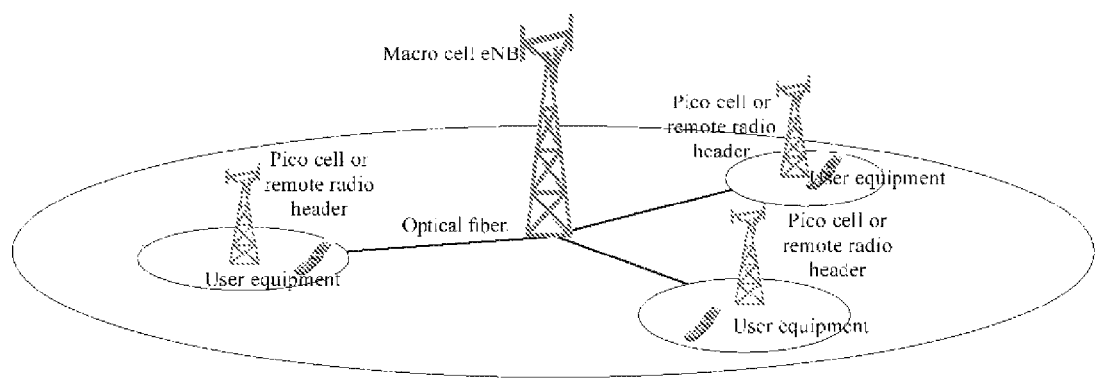
FIG. 1 illustrates a schematic structural diagram of a network topology according to an embodiment of the invention.

FIG. 1 illustrates a schematic structural diagram of a network topology according to an embodiment of the invention, and the network includes a plurality of pico base stations and Remote Radio Headers (RRHs) distributed in a macro cell. Since uplink and downlink service traffic in one cell may differ from that in another cell, high spectrum efficiency can be achieved with TDD dynamic frame configuration for different cells. For the convenience of application, uplink and downlink service configuration for only a pico base station and an RRH can dynamically vary.

A well known advantage of a TDD system over a Frequency Division Duplex (FDD) system lies in asymmetry of its air interface frame structure between the uplink and downlink. This means that in a TDD frame, the number of Transmission Time Intervals (TTIs) in the uplink may different from that in the downlink, and the ratio thereof can be dynamically configured dependent upon the change in uplink and downlink service traffic. Seven types of uplink and downlink configuration as depicted in Table 1 below are defined in 3GPP TS 36.211.

TABLE 1

| Configuration | Downlink and uplink ratio | Switching period | The number of subframe | | | | | | | | | |
|---|---|---|---|---|---|---|---|---|---|---|---|---|
| | | | 0 | 1 | 2 | 3 | 4 | 5 | 6 | 7 | 8 | 9 |
| 0 | 1:3 | 5 ms | D | S | U | U | U | D | S | U | U | U |
| 1 | 1:1 | 5 ms | D | S | U | U | D | D | S | U | U | D |
| 2 | 3:1 | 5 ms | D | S | U | D | D | D | S | U | D | D |
| 3 | 2:1 | 10 ms | D | S | U | U | U | D | D | D | D | D |
| 4 | 7:2 | 10 ms | D | S | U | U | D | D | D | D | D | D |
| 5 | 8:1 | 10 ms | D | S | U | D | D | D | D | D | D | D |
| 6 | 3:5 | 10 ms | D | S | U | U | U | D | S | U | U | D |

Where D represents a subframe reserved for downlink transmission, U represents a subframe reserved for uplink transmission, and S represents a special subframe including three fields, including DwPTS, GP and UpPTS respectively.

Dynamic frame configuration is intended to provide a useful method to improve the utilization ratio of a bandwidth. However the existing frame structure is configured in a period of 40 ms over a Broadcast Channel (BCH), which may mismatch a varying rate of an instant service condition. Furthermore some flexibility may be lost for a downlink/uplink notification over the BCH, e.g., user equipment-specific configuration, etc., that is, the broadcast channel is intended for all of user equipments in a cell but not particularly for a specific user equipment. In the CoMP scenario 4, that is, in the scenario where a macro cell and a pico cell have the same cell ID, specific configuration is required for specific user equipment. Thus the invention proposes a design/redefinition of implicit and explicit signaling so as to support dynamic TDD frame configuration in the LTE Release 11.

In the invention, in the scenario where a macro cell and a pico cell adopt the same cell ID, that is, in the CoMP scenario 4, dynamic TDD frame configuration is transmitted from a macro eNB to a Rel-11 user equipment served by a pico cell through a pico eNB.

In the scenario where a macro cell and a pico cell adopt different cell IDs, that is, in the CoMP scenario 3, dynamic TDD frame configuration is transmitted from a pico eNB directly to a user equipment served by the pico eNB.

A Remote Radio Header (RRH) node has no central processing unit and forwards signaling from the macro eNB, so dynamic TDD frame configuration is transmitted from a macro eNB to a Rel-11 user equipment served by the RRH through the RRH.

Of course the invention is also applicable to the scenario of a Femto cell, which is similar to a Pico cell and therefore a repeated description of which will be omitted here.

Figure 2:
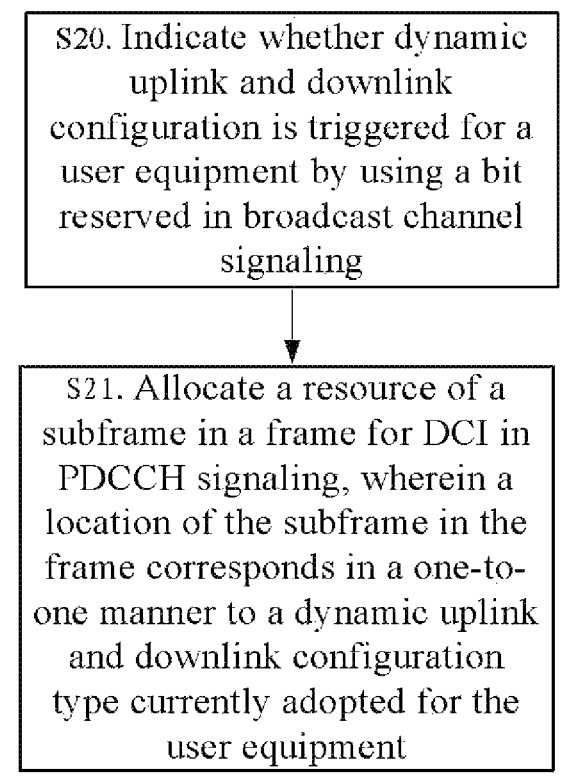
FIG. 2 illustrates a flow chart of a method of operating in a base station according to an embodiment of the invention.

FIG. 2 illustrates a flow chart of a method according to an embodiment of the invention. A description will be given below with reference to FIG. 2 of a base station implicitly informing a user equipment of its dynamic uplink and downlink configuration type according to the invention.

a) Implicit Notification Scheme

An implicit notification includes two parts:

Part I: Dynamic uplink/downlink configuration is triggered by modified broadcast signaling.

Firstly in the step S20, a macro eNB (in the Comp scenario 4) or a pico eNB (in the Comp scenario 3) indicates whether dynamic uplink and downlink configuration is triggered for a user equipment with a bit reserved in broadcast channel signaling. For convenience of descriptions below, unless stated otherwise, a base station 1 covers the base station in the invention intended to transmit trigger information or new dynamic uplink and downlink configuration information. The base station can include a macro base station (in the Comp scenario 4), or a pico eNB (in the Comp scenario 3), or a Femto cell eNB.

The base station 1 modifies broadcast contents of a TDD frame structure over a Physical Broadcast Channel (PBCH) to trigger rapid dynamic frame configuration in a valid period. For example the base station indicates whether dynamic configuration is triggered for an R11 TDD user equipment with one or more originally reserved bits. For an R8-R10 user equipment, the bit(s) is (are) skipped for the purpose of backward compatibility.

Figure 3A:
FIG. 3a illustrates a schematic diagram of indicating which uplink and downlink configuration type is to be adopted in the prior art.
Figure 3B:
FIG. 3b illustrates a schematic diagram of indicating that a dynamic uplink and downlink configuration type is triggered according to an embodiment of the invention.

In an existing TDD LTE system, uplink and downlink frame configuration is broadcast in 3-bit signaling over a BCCH to distinguish seven different types of configuration as illustrated in FIG. 3a. As known, there are two bits reserved over a PBCH for further use. In order to support dynamic uplink and downlink configuration in the R11, the invention seeks to trigger this dynamic function in one of the two reserved bits. As illustrated in FIG. 3b, the bit is represented as a Trigger Indicator (TI). TI=1 indicates that dynamic uplink and downlink allocation is allowed for a pico base station/an RRH; otherwise, TI=0 indicates the function is disabled.

In an R11 heterogeneous network, if a macro eNB knows a dynamic frame configuration demand from its own scheduling instruction or a pico eNB, then the base station 1 will broadcast the modified signaling to indicate that TDD uplink and downlink dynamic configuration is triggered in the next valid period until the TI is modified to 0.

Figure 4:
FIG. 4 illustrates a schematic diagram of a frame format representing uncertain subframe configuration according to an embodiment of the invention.

As compared with the seven types of configuration defined in Table 1, a subframe which may change in a frame is located in subframes 3, 4, 6, 7, 8 and 9. Among them, possible configuration of the subframes 3, 4, 8 and 9 is downlink or uplink configuration, and possible configuration of the subframes 6 and 7 is SU or DD. Therefore the inventors represent the uncertain configuration of these subframes as H (Hybrid). As illustrated in FIG. 4, this means that when an R11 user equipment detects PBCH signaling with TI=1, the 3-bit BCCH frame configuration is invalidated, and the system supports dynamic frame configuration now. For backward compatibility, the 3-bit BCCH frame configuration is still valid for R8, R9 and R10 user equipments.

For an R11 user equipment with successful detection of TI=1, there is a PBCH period of 40 ms and thus it may not match varying service traffic on the one hand; and the user equipment only knows the change of the frame structure to a frame structure including six uncertain subframes and this will be insufficient for further detailed resource allocation, on the other hand.

In order to address the foregoing problem, for different TDD uplink and downlink configuration, for a valid period of each dynamic frame configuration, UL DCI 0/4 transmission is fixed in a subframe at a different location in a first frame or in a first half-frame of the first frame to distinguish the specified uplink and downlink configuration, according to the invention. The valid period of the dynamic frame configuration can be configured at higher layer, for example, as 20 ms. It is worthy noting that uplink DCI transmission in other frame or half-frame in a valid period of dynamic frame configuration will not be limited to this implicit notification rule. A rule by which a specific dynamic uplink and downlink configuration is informed will be described in details in the part II.

Part II: A dynamic uplink/downlink configuration notification with a valid period for dynamic frame configuration is used at the location of Downlink Control Information (UL DCI) (in the format 0/4) or DL DCI over a Physical Downlink Control Channel (PDCCH).

Then in the step S21, when the base station 1 triggers dynamic uplink and downlink configuration for the user equipment 2, the base station 1 allocates a resource of a subframe in a frame for DCI in PDCCH signaling when the dynamic uplink and downlink configuration is triggered for the user equipment 2 by the base station 1, wherein a location of the subframe in the frame corresponds in a one-to-one manner to a dynamic uplink and downlink configuration type currently adopted by the user equipment, and the location of the subframe in the frame indicates a dynamic uplink and downlink configuration type currently adopted by the user equipment.

A description will be given below taking UL DCI as an example.

For an implicit notification, the present invention associates a current frame structure with the location of the UL DCI format 0/4 in the frame. Subsequently the DCI 0/4 can be allocated to a different subframe to inform the UE dynamically of current frame uplink and downlink configuration.

Specifically for the TDD uplink and downlink configuration 0, an "Uplink Index (UL index)" is defined in UL DCI (in the format 0/4) to inform, the user equipment with successful detection, of a Physical Uplink Shared Channel (PUSCH) transmission subframe expected by the eNB.

For the TDD uplink and downlink configurations 1-6, a value of $V_{DAI}^{UL}$ indicated in an "Downlink Assign Index" (DAI) present in UL DCI can also indicate corresponding PUSCH transmission in a specific subframe. Details thereof are described in Section 8 of 3GPP TS 36.213.

Table 2 below depicts a relationship between a subframe n having an UL DCI format and the corresponding PUSCH transmission subframe n+k (which may be n+7 or both of n+k and n+7 for the uplink and downlink configuration 0 as indicated in 3GPP TS 36.213). In Table 2, column headings 0-9 represent the number of subframes, and row headings 0-6 represent TDD uplink and downlink configuration respectively. Numerals in boxes of Table 2 represent k, that is, identify a relationship between a subframe with the UL DCI format and a PUSCH transmission subframe. As can be apparent from Table 2, the UL DCI format can be transmitted in a plurality of PUCCH subframes for each configuration type (including the TDD uplink and downlink configurations 0-4 and 6) except the uplink and downlink configuration 5, thus resulting in high flexibility. Furthermore the user equipment adjusts uplink PUSCH transmission in the subframe n+k upon reception of the PDCCH with the UL DCI format.

TABLE 2

| TDD uplink and downlink configuration n | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 6 | | | | 4 | 6 | |
| 1 | | | | 6 | | | 4 | | 6 | |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | | 7 | 7 | | | | | 7 | 7 | 5 |

In view of Table 2 above, the inventors of the invention have defined Table 3 below to establish a relationship between a subframe that carries the UL DIC 0/4 and specified uplink and downlink configuration. It should be noted that a subframe of the UL DCI 0/4 corresponds in a one-to-one manner to specified uplink and downlink configuration. For example, in a first frame in a valid period of dynamic TDD frame configuration, if the UE detects a PDCCH located in the subframe n=3 and carrying the UL DCI 0/4, then it knows the current configuration type is 2. Thus the scheduled UE is dynamically informed of this specific configuration in the fixed frame upon reception of broadcast information with TI=1.

Stated otherwise, the valid period of dynamic frame configuration may be configured at an higher layer or terminated upon detection of TI=0 by the user equipment.

Of course, Table 3 below is merely illustrative, and those skilled in the art can appreciate that a mapping table mapping a PDCCH with the UL DCI 0/4 and dynamic uplink and downlink configuration in one-to-one correspondence is not unique, and the foregoing instance is merely an example, but mapping table other than the mapping relationship depicted in Table 3 can be devised without departing from the spirit of the invention. According to the following Table 3, a frame configuration may switch to another. For example, if frame configuration changes from the configuration type 0 to the configuration type 4, then UL DCI will be transmitted in a subframe 9 in a starting frame of a new valid period while invalidating prior frame configuration.

TABLE 3

| TDD uplink and downlink configuration n | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | | ✓ | | | | | | |
| 1 | | | | | | ✓ | | | | |
| 2 | | | | | ✓ | | | | | |
| 3 | | | ✓ | | | | | | | |
| 4 | | | | | | | | | | ✓ |
| 5 | | | | | | | | | ✓ | |
| 6 | | | | | | | ✓ | | | |

In another embodiment, a cell specific period of this type of valid DCI 0 can be defined so as to avoid too many restrictions on CCE scheduling from being introduced.

For example, the DCI 0/4 transmitted in a first frame or a first half-frame of the first frame in each valid period of a dynamic configuration frame can be considered as valid DCI 0/4. UL DCI transmission in other frame or half-frame in a valid period of a dynamic configuration frame will not be construed as an implicit notification rule.

The implicit notification scheme proposed above can be well performed in an RRC connection mode, and an R11 user equipment in other mode, e.g., an idle mode, a Discontinuous Reception (DRX) period, handover, etc obtains a TDD frame structure from dynamic configuration in the same method as R8-R10 user equipments.

As described above, this proposed solution can enable flexible dynamic frame configuration without increasing signaling overhead and thus can be easily applied to a real heterogeneous network and also to an RRH in the scenarios 3 and 4 discussed in R11.

Explicit Notification Scheme

A new DCI format, denoted with DCI 5, is required for an explicit uplink and downlink notification and functions to information a UE directly of specified uplink and downlink configuration. Detailed contents embedded in the DCI 5 include uplink and downlink configuration and other information required for uplink and downlink co-channel/neighboring channel interference cancellation/coordination of a control signal or a data channel.

The new DCI design may result in an effort of blinding decoding and a large downlink overhead of the user equipment. In order to reduce consumption, the trigger method proposed in the implicit notification scheme can be optionally used so that high complexity of blinding decoding will arise only in a trigger cycle of dynamic uplink and downlink configuration.

As described above, the two implicit and explicit notification schemes have been proposed to support uplink and downlink configuration in a TDD heterogeneous network. The implicit scheme has such an advantage that no extra signaling overhead is required but it limits flexibility of UL DCI and PUSCH transmission in a first frame or a first half-frame of the first frame in a valid period of dynamic TDD configuration. On the contrary, an advantage of the explicit notification scheme is that it can be easily performed without limiting any flexibility of transmission, but its disadvantage is increased complexity of DCI blinding decoding due to the newly designed DCI format. Furthermore there is a larger DL overhead resulting from an explicit notification. Despite this, both of the schemes can support dynamic uplink and downlink configuration in a real TDD heterogeneous network.

The invention has been described above from the perspective of a method and will be described briefly from the perspective of an apparatus.

Firstly a first apparatus is located in a central processing unit of a control device of a pico cell or a macro cell of a heterogeneous network based upon a time division duplex system and configured to instruct a user equipment to perform dynamic uplink and downlink resource configuration. The first apparatus includes: a first triggering device configured to indicate whether the dynamic uplink and downlink configuration is triggered for the user equipment in a bit reserved in broadcast channel signaling; an allocating device configured to allocate a resource of a subframe in a frame for downlink control information in physical downlink control channel signaling when the dynamic uplink and downlink configuration is triggered for the user equipment, wherein a location of the subframe in the frame corresponds in a one-to-one manner to a dynamic uplink and downlink configuration type currently adopted by the user equipment, and the location of the subframe in the frame indicates a dynamic uplink and downlink configuration type currently adopted for the user equipment; and a first transmitting device configured to transmit the physical downlink control channel signaling including the frame to the user equipment.

A second apparatus is located in a control device of a pico cell of a heterogeneous network based upon a time division duplex system and configured to instruct a user equipment to perform dynamic uplink and downlink resource configuration. The second apparatus includes: a second transmitter configured to transmit newly defined downlink control information to the user equipment to inform the user equipment of the dynamic uplink and downlink resource configuration, the newly defined downlink control information including an uplink and downlink configuration type and information for uplink and downlink co-channel or neighboring channel interference cancellation or coordination.

The third apparatus is located in a user equipment in a pico cell of a heterogeneous network based upon a time division duplex system and configured to obtain dynamic uplink and downlink resource configuration information from a base station. The third apparatus includes: a first receiver configured to receive broadcast channel signaling from the base station, wherein the broadcast channel signaling includes a bit indicating whether dynamic uplink and downlink configuration is triggered for the user equipment; and the first receiver is further configured to receive physical downlink control channel signaling when the bit indicates that the dynamic uplink and downlink configuration is triggered for the user equipment, wherein the physical downlink control channel signaling includes downlink control information, and a location of a subframe including the downlink control information in a frame indicates a dynamic uplink and downlink configuration type currently adopted by the user equipment; and a transmitter configured to perform corresponding uplink and downlink transmission according to the dynamic uplink and downlink configuration type.

The fourth apparatus is located in a user equipment in a pico cell of a heterogeneous network based upon a time division duplex system and configured to obtain dynamic uplink and downlink resource configuration information from a base station. The fourth apparatus includes: a second receiver configured to receive downlink control information from the base station to inform the user equipment of dynamic uplink and downlink resource configuration, the downlink control information including an uplink and downlink configuration type and information for uplink and downlink co-channel or neighboring channel interference cancellation or coordination The embodiments of the invention have been described above, but the invention will not be limited to any specific system, device and protocol, and those skilled in the art can make various variations or modifications without departing from the scope of the invention.

Those ordinarily skilled in the art can appreciate and make other variations to the disclosed embodiments upon review of the description, the disclosure and the drawings as well as the claims. In the claims, the term "comprise(s)/comprising" will not preclude another element(s) and step(s), to and the term "a" or "an" will not preclude plural. In the invention, the terms "first", "second", etc., denote a name but will not represent any ordinal relationship. In a practical application of the invention, an element may perform functions of a plurality of technical features cited in a claim. Any reference numerals in the claims shall not be construed as limiting the scope of the invention.

The invention claimed is:

1. A method, in a central processing unit of a control device of a pico cell or a macro cell of a heterogeneous network based upon a time division duplex system, of instructing a user equipment to perform a dynamic uplink and downlink resource configuration, the method comprising:

indicating whether the dynamic uplink and downlink configuration is triggered for the user equipment by using a bit reserved in broadcast channel signaling;

allocating a resource of a subframe in a frame for downlink control information in physical downlink control channel signaling when the dynamic uplink and downlink configuration is triggered for the user equipment, wherein a location of the subframe in the frame corresponds in a one-to-one manner to a dynamic uplink and downlink configuration type currently adopted by the user equipment, and the location of the sub-frame in the frame indicates a dynamic uplink and downlink configuration type currently adopted by the user equipment; and transmitting the physical downlink control channel signaling comprising the frame to the user equipment.

2. The method according to claim 1, wherein the subframe is located in a first frame during each short period or a first half-frame of the first frame during each short period.

3. The method according to claim 1, wherein the physical downlink control channel signaling adopts a cyclic redundancy check scrambled with a user equipment specific cell radio network temporary identifier.

4. The method according to claim 1, wherein the control device comprises a pico cell base station or a remote radio header.

5. A method, in a control device of a pico cell of a heterogeneous network based upon a time division duplex system, of instructing a user equipment to perform a dynamic uplink and downlink resource configuration, the method comprising:

allocating a resource of a subframe in a frame for downlink control information in physical downlink control channel signaling when a dynamic uplink and downlink configuration is triggered for the user equipment, wherein a location of the subframe in the frame corresponds in a one-to-one manner to a dynamic uplink and downlink configuration type currently adopted by the user equipment, and the location of the subframe in the frame indicates a dynamic uplink and downlink configuration type currently adopted by the user equipment;

transmitting newly defined downlink control information to the user equipment to inform the user equipment of the dynamic uplink and downlink resource configuration, the newly defined downlink control information comprising a dynamic uplink.

6. The method according to claim 5, wherein before the transmitting, the method further comprises:

indicating whether the dynamic uplink and downlink configuration is triggered for the user equipment by using a bit reserved in broadcast channel signaling.

7. A method, in a user equipment in a pico cell of a heterogeneous network based upon a time division duplex system, of obtaining dynamic uplink and downlink resource configuration information from a base station, the method comprising:

receiving broadcast channel signaling from the base station, wherein the broadcast channel signaling comprises a bit indicating whether dynamic uplink and downlink configuration is triggered for the user equipment; and receiving physical downlink control channel signaling when the bit indicates that the dynamic uplink and downlink configuration is triggered for the user equipment, wherein the physical downlink control channel signaling comprises downlink control information, and a location of a sub-frame comprising the downlink control information in a frame indicates a dynamic uplink and downlink configuration type currently adopted by the user equipment; and performing corresponding uplink and downlink transmission according to the dynamic uplink and downlink configuration type.

8. A method, in a user equipment in a pico cell of a heterogeneous network based upon a time division duplex system, of obtaining dynamic uplink and downlink resource configuration information from a base station, the method comprising:

receiving downlink control information from the base station to informing the user equipment of dynamic uplink and downlink resource configuration, the downlink control information comprising an uplink and downlink configuration type;

wherein the downlink control information includes information describing an allocation of a resource of a subframe in a frame for downlink control information in physical downlink control channel signaling when a dynamic uplink and downlink configuration is triggered for the user equipment, wherein a location of the subframe in the frame corresponds in a one-to-one manner to a dynamic uplink and downlink configuration type currently adopted by the user equipment, and the location of the subframe in the frame indicates a dynamic uplink and downlink configuration type currently adopted by the user equipment.

9. The method according to claim 8, wherein before the receiving downlink control information from the base station, the method further comprises:

receiving a bit reserved in broadcast channel signaling to indicate whether the dynamic uplink and downlink configuration is triggered for the user equipment; and performing the receiving downlink control information from the base station, when the bit reserved in the broadcast channel signaling indicates that the dynamic uplink and downlink configuration is triggered for the user equipment.

10. A apparatus, in a central processing unit of a control device of a pico cell or a macro cell of a heterogeneous network based upon a time division duplex system, for instructing a user equipment to perform a dynamic uplink and downlink resource configuration, the first apparatus comprising:

a triggering device, configured to indicate whether the dynamic uplink and downlink configuration is triggered for the user equipment by using a bit reserved in broadcast channel signaling;

an allocating device, configured to allocate a resource of a sub-frame in a frame for downlink control information in physical downlink control channel signaling when the dynamic uplink and downlink configuration is triggered for the user equipment, wherein a location of the sub-frame in the frame corresponds in a one-to-one manner to a dynamic uplink and downlink configuration type currently adopted by the user equipment, and the location of the sub-frame in the frame indicates a dynamic uplink and downlink configuration type currently adopted by the user equipment; and a first transmitter, configured to transmit the physical downlink control channel signaling comprising the frame to the user equipment.

11. The apparatus according to claim 10, wherein the sub-frame is located in a first frame during each short period or a first half-frame of the first frame during each short period.

12. A apparatus, in a control device of a pico cell of a heterogeneous network based upon a time division duplex system, for instructing a user equipment to perform a dynamic uplink and downlink resource configuration, the apparatus comprising:

an allocating device configured to allocate a resource of a subframe in a frame for downlink control information in physical downlink control channel signaling when a dynamic uplink and downlink configuration is triggered for the user equipment, wherein a location of the subframe in the frame corresponds in a one-to-one manner to a dynamic uplink and downlink configuration type currently adopted by the user equipment, and the location of the sub-frame in the frame indicates a dynamic uplink and downlink configuration type currently adopted by the user equipment;

a transmitter, configured to transmit newly defined downlink control information to the user equipment to inform the user equipment of the dynamic uplink and downlink resource configuration, the newly defined downlink control information comprising an uplink and downlink configuration type.

13. The apparatus according to claim 12, further comprising:

a triggering device, configured to indicate whether the dynamic uplink and downlink configuration is triggered for the user equipment by using a bit reserved in broadcast channel signaling.

14. A apparatus, in a equipment in a pico cell of a heterogeneous network based upon a time division duplex system, for obtaining dynamic uplink and downlink resource configuration information from a base station, the third apparatus comprising:

a receiver, configured to receive broadcast channel signaling from the base station, wherein the broadcast channel signaling comprises a bit indicating whether dynamic uplink and downlink configuration is triggered for the user equipment; and the receiver is further configured to receive physical downlink control channel signaling when the bit indicates that the dynamic uplink and downlink configuration is triggered for the user equipment, wherein the physical downlink control channel signaling comprises downlink control information, and a location of a sub-frame comprising the downlink control information in a frame indicates a dynamic uplink and downlink configuration type currently adopted by the user equipment; and a transmitter configured to perform corresponding uplink and downlink transmission according to the dynamic uplink and downlink configuration type.

15. A apparatus, in a user equipment in a pico cell of a heterogeneous network based upon a time division duplex system, for obtaining dynamic uplink and downlink resource configuration information from a base station, the apparatus comprising:

a receiver, configured to receive downlink control information from the base station to inform the user equipment of dynamic uplink and downlink resource configuration, the downlink control information comprising an uplink;

wherein the downlink control information includes information describing an allocation of a resource of a subframe in a frame for downlink control information in physical downlink control channel signaling when a dynamic uplink and downlink configuration is triggered for the user equipment, wherein a location of the subframe in the frame corresponds in a one-to-one manner to a dynamic uplink and downlink configuration type currently adopted by the user equipment, and the location of the sub-frame in the frame indicates a dynamic uplink and downlink configuration type currently adopted by the user equipment.

* * * * *